United States Patent
Juarez et al.

(10) Patent No.: US 8,381,308 B2
(45) Date of Patent: *Feb. 19, 2013

(54) COMPUTER-IMPLEMENTED MULTI-RESOURCE SHARED LOCK

(75) Inventors: Larry Juarez, Tucson, AZ (US); Kenny Nian Gan Qiu, Tucson, AZ (US); David Victorino Valverde, Tucson, AZ (US)

(73) Assignee: International Business Corporation, Armonk, NY (US)

( * ) Notice: Subject to any disclaimer, the term of this patent is extended or adjusted under 35 U.S.C. 154(b) by 922 days.

This patent is subject to a terminal disclaimer.

(21) Appl. No.: 12/473,215

(22) Filed: May 27, 2009

(65) Prior Publication Data

US 2010/0306432 A1 Dec. 2, 2010

(51) Int. Cl.
*G06F 7/04* (2006.01)
*G06F 21/00* (2006.01)
*H04L 29/06* (2006.01)

(52) U.S. Cl. ............... 726/27; 726/2; 726/26; 713/150; 713/182

(58) Field of Classification Search .................... 726/27, 726/2, 26; 713/150, 182
See application file for complete search history.

(56) References Cited

U.S. PATENT DOCUMENTS

| | | | | |
|---|---|---|---|---|
| 4,574,350 A * | 3/1986 | Starr | | 710/200 |
| 5,202,990 A * | 4/1993 | Saikawa | | 710/200 |
| 5,586,331 A | 12/1996 | Levenstein | | 395/726 |
| 6,032,216 A | 2/2000 | Schmuck et al. | | 710/200 |
| 6,748,470 B2 * | 6/2004 | Goldick | | 710/200 |
| 6,925,515 B2 | 8/2005 | Burns et al. | | 710/200 |
| 7,171,581 B2 * | 1/2007 | Wu | | 714/4.1 |
| 2004/0220933 A1 | 11/2004 | Walker | | 707/8 |
| 2005/0235289 A1 | 10/2005 | Barillari et al. | | 718/100 |
| 2006/0136637 A1 | 6/2006 | Goldick | | 710/200 |
| 2008/0086470 A1 | 4/2008 | Graefe | | 707/8 |
| 2010/0017409 A1 * | 1/2010 | Rawat et al. | | 707/8 |
| 2010/0242043 A1 * | 9/2010 | Shorb | | 718/104 |

OTHER PUBLICATIONS

A. Thomasian, "Concurrency Control: Methods, Performance, and Analysis", ACM Computing Surveys, vol. 30, No. 1, Mar. 1998.
Appavoo et al., "Experience Distributing Objects in an SMMP OS", ACM Transactions on Computer Systems, vol. 25, No. 3, Article 6, Aug. 2007.

* cited by examiner

*Primary Examiner* — Mohammad W Reza
(74) *Attorney, Agent, or Firm* — John H. Holcombe (57) ABSTRACT

In one embodiment of a computer-implemented system, comprising a plurality of computer entities and multiple resources, one of the computer entities may request a multi-resource lock to one of the multiple resources; the one resource determines whether a resource lock is available at the one resource and, if so, the one resource communicates with all peer resources to determine whether a resource lock is available; if the peer resources indicate a resource lock is available, lock all of the resources to the requesting computer entity, and the one resource communicates the lock of the resources to the requesting computer entity; and if any the resource indicates contention for the multi-resource lock, the one resource communicates the contention to the requesting computer entity, and the requesting computer entity backs off the multi-resource lock request and, after a random time interval, repeats the request.

17 Claims, 6 Drawing Sheets

COMPUTER-IMPLEMENTED MULTI-RESOURCE SHARED LOCK

DOCUMENT INCORPORATED BY REFERENCE

Commonly assigned U.S. patent application Ser. No. 12/354,736, Filed Jan. 15, 2009, is incorporated for its showing of a server system.

FIELD OF THE INVENTION

This invention relates to computer entities, for example, employed in server systems, and more particularly to locking resources within such systems.

BACKGROUND OF THE INVENTION

Servers, such as data storage servers, have become complex and involve various hardware such as data storage media, storage controllers, memories, and the accompanying power systems, cooling systems, etc.

Storage controllers control access to data storage media and memories in response to read and write requests. The storage controllers may direct the data in accordance with data storage devices such as RAID (redundant array of independent disks), JBOD (just a bunch of disks), and other redundancy and security levels.

As an example, an IBM® ESS (Enterprise Storage Server) such as a DS8000 has redundant clusters of computer entities, cache, non-volatile storage, etc., called "central electronics complexes" or "CECs". The CECs may be partitioned into logical partitions or field images running within the system, where each partition is also redundant, including partitions within each of the CECs.

The resources within the system are shared by the field images and controlled employing a rack power control module (RPC) which may configure the system (controlling the power supply and cooling sequencing and operation, etc.).

The rack power control module is also redundant, and each rack power control module is capable of controlling the same hardware.

In order to avoid having multiple field images (or computer entities) controlling the same resources, a Master lock is used to select one of the field images to manage the shared hardware resources through the rack power control modules, as the field images operate independent of each other, and there is no communication between them. For example, a race situation exists in which each field image needs to communicate to every shared hardware resource that it can and separately race for the Master lock. When various field images are attempting to obtain the Master lock that is shared between two RPC's, various kinds of problems can arise, such as communication failure(s) between the field images and RPC's, and contention problems when the various field images attempt to obtain the Master lock at the same time. Multiple locks may be obtained such that the system cannot tell which field image is the master and may confuse the desired recovery actions.

SUMMARY OF THE INVENTION

Server systems, resource configuration systems, and computer program products are provided for multi-resource locking.

In one embodiment of a computer-implemented system comprising a plurality of computer entities and multiple resources, the following is performed: one of the computer entities requesting a multi-resource lock to one of the multiple resources;

the one resource determining whether a resource lock is available at the one resource and, if so, communicating with all peer resources to determine whether a resource lock is available;

if the peer resources indicate a resource lock is available, lock all of the resources to the requesting computer entity, and the one resource communicates the lock of the resources to the requesting computer entity; and if any resource indicates contention for the multi-resource lock, the one resource communicates the contention to the requesting computer entity, and the requesting computer entity backs off the multi-resource lock request and, after a random time interval, repeats the request.

In a further embodiment, additionally, if the requesting computer entity is unable to communicate with the one resource to determine whether the multi-resource lock is available, the requesting computer entity requesting the multi-resource lock to a peer resource of the multiple resources.

In another embodiment, additionally, the peer resource determines whether a resource lock is available at the peer resource and, if so, communicating with all other resources, including the one resource, to determine whether a resource lock is available;

if the other resources indicate a resource lock is available, lock all of the resources to the requesting computer entity, and the peer resource communicates the lock of the resources to the requesting computer entity; and if any of the resources indicate contention for the multi-resource lock, the peer resource communicates the contention to the requesting computer entity, and the requesting computer entity backs off the request and, after a random time interval, repeats the request.

In a further embodiment, if the peer resource determines a resource lock is available at the peer resource, and is unable to communicate with all the other resources to determine whether a resource lock is available, the peer resource communicates the failure to the requesting computer entity; and the requesting computer entity backs off the multi-resource request and, after a random time interval, requests a single-resource lock to a default resource of the multiple resources.

In another embodiment, if the default resource indicates contention for the lock, the default resource communicates the contention to the requesting computer entity, and the requesting computer entity backs off the single-resource lock request and, after a random time interval, repeats the request.

In a further embodiment, if the one resource determines a resource lock is available at the one resource, and is unable to communicate with all the peer resources to determine whether a resource lock is available, the one resource communicates the failure to the requesting computer entity; and the requesting computer entity backs off the multi-resource request and, after a random time interval, requests a single-resource lock to a default resource of the multiple resources.

In another embodiment, additionally, if the requesting computer entity is unable to communicate with the default resource to determine whether the single-resource lock is available, the requesting computer entity requesting the single-resource lock to any available resource of the multiple resources.

In a further embodiment, the multiple resources each comprises at least one data storage device.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
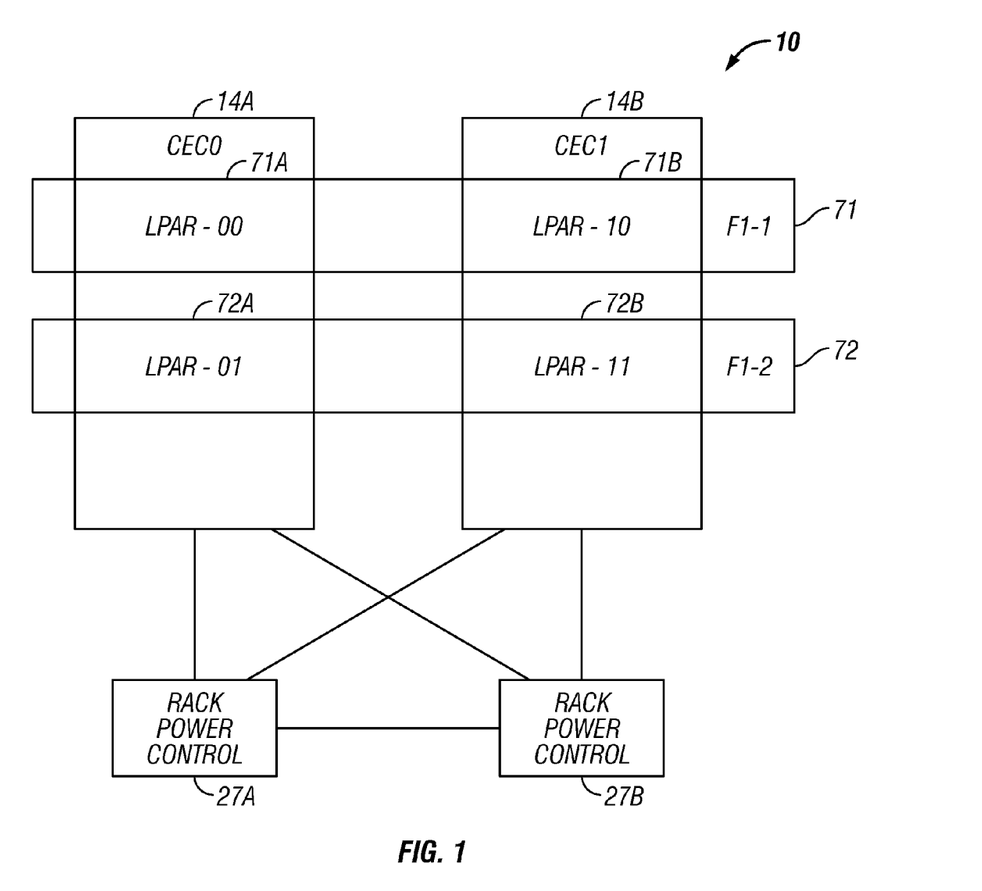
FIG. 1 is a block diagram of an exemplary computer-based storage server system which may implement aspects of the present invention.
Figure 2:
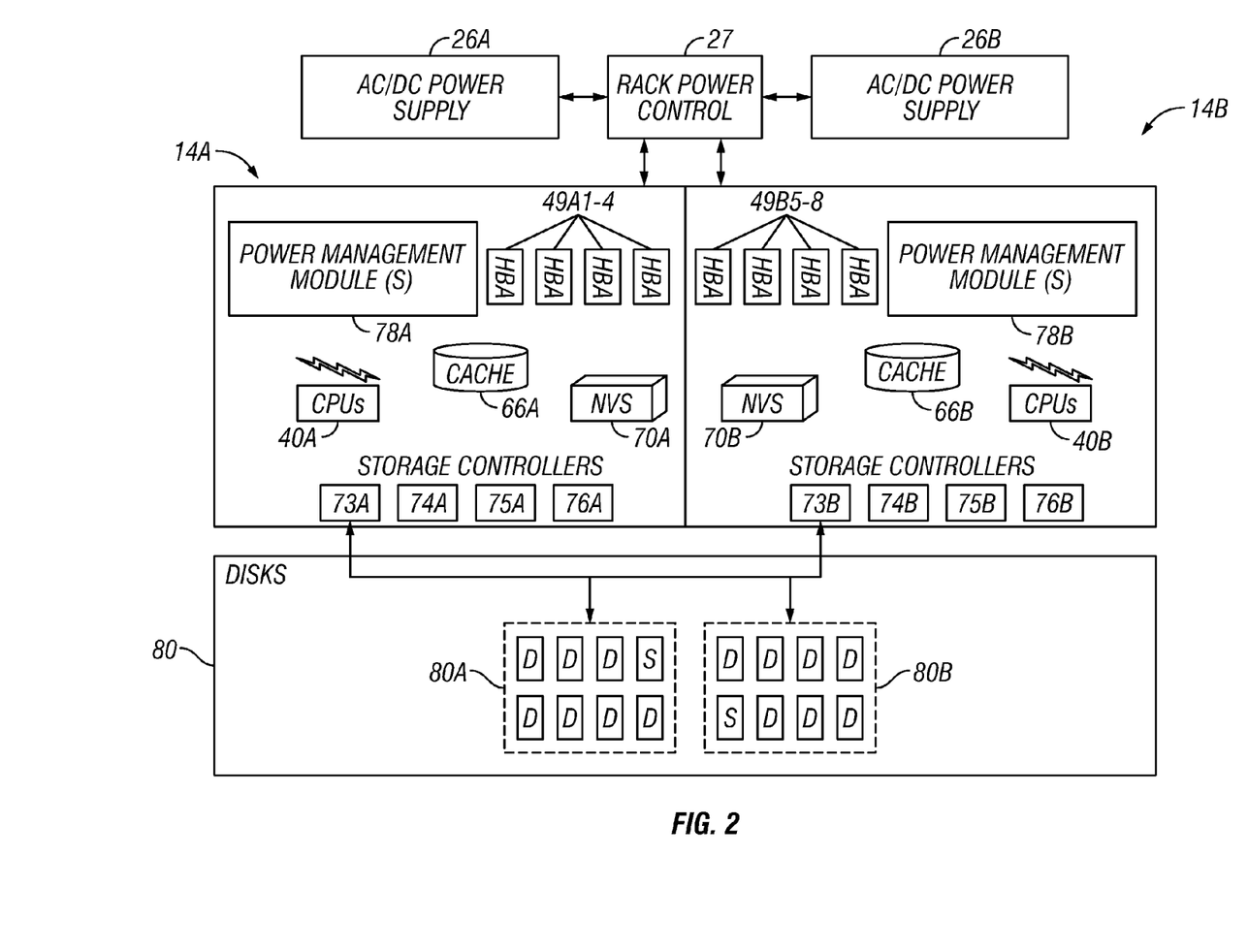
FIG. 2 is a block diagram of a partition of the storage server system of FIG. 1.

Referring to FIGS. 1 and 2, an example of a computer-based server system 10 is illustrated which is arranged for redundancy. The system is one of many computer-based systems which may implement the present invention.

The server system 10 comprises redundant complexes 14A and 14B, and comprises redundant rack power control (RPC) modules 27A and 27B which detect the hardware configuration and control the power sequencing for the storage server. The complexes 14A and 14B may be referred to herein as "CECs" (Central Electronics Complexes) as each of the complexes contains electronics subcomponents responsible for carrying out and managing data storage.

The server system 10 may be arranged in logical field images 71 and 72, each of which spans both of the redundant complexes 14A and 14B. The field image within each of the complexes is a logical partition (LPAR) 71A, 71B, 72A, 72B.

In the exemplary embodiment of FIG. 2, CECs 14A and 14B control the storage of data at storage array 80 which is also arranged in a redundant manner, for example, as one or more storage devices commonly referred to as one or more redundant arrays of independent disks (RAID) which include both data and parity storage, or as just a bunch of disks (JBOD). The data storage 80 may comprise one or more sets of disks 80A, 80B, and each set of disks may comprise a system with one or more spares "S".

An example of a server system 10 comprises the IBM® DS8000. Another example of a server system 10 comprises that described in incorporated U.S. patent application Ser. No. 12/354,736.

The redundant CECs 14A and 14B each comprises, for example, CPUs 40A, 40B, cache 66A, 66B, non-volatile storage (NVS) 70A, 70B, and storage controllers 73A, 74A, 75A, 76A and 73B, 74B, 75B, 76B. Clients may communicate with the complexes, for example, via the host bus adapters (HBA) 49A1-4, 49B5-8, for example, employing fiber optic communications.

The resources within the system are shared by the CECs and controlled employing a rack power control module (RPC) 27 which may configure the system (controlling the power supply and cooling sequencing and operation, etc.). Redundant power supply units 26A, 26B may include both alternating current and direct current power supply units and battery backup capabilities. Redundant power management modules 78A, 78B monitor the power supply units, including the power and remaining battery life of the battery backup.

Referring additionally to FIG. 1, the rack power control module 27 may comprise either of the rack power control modules 27A and 27B and is capable of controlling the same hardware, comprising for example both CECs 14A and 14B.

In order to avoid having multiple field images 71, 72 (or computer entities) controlling the same resources, a Master lock is used to select one of the field images to manage the shared hardware resources through the rack power control modules 27A, 27B, as the field images 71, 72 operate independent of each other, and there is no communication between them. For example, a race situation exists in which each field image needs to communicate to every shared hardware resource that it can and separately race for the Master lock. The field images attempt to obtain the Master lock that is shared between two RPC's 27A, 27B.

Figure 3A:
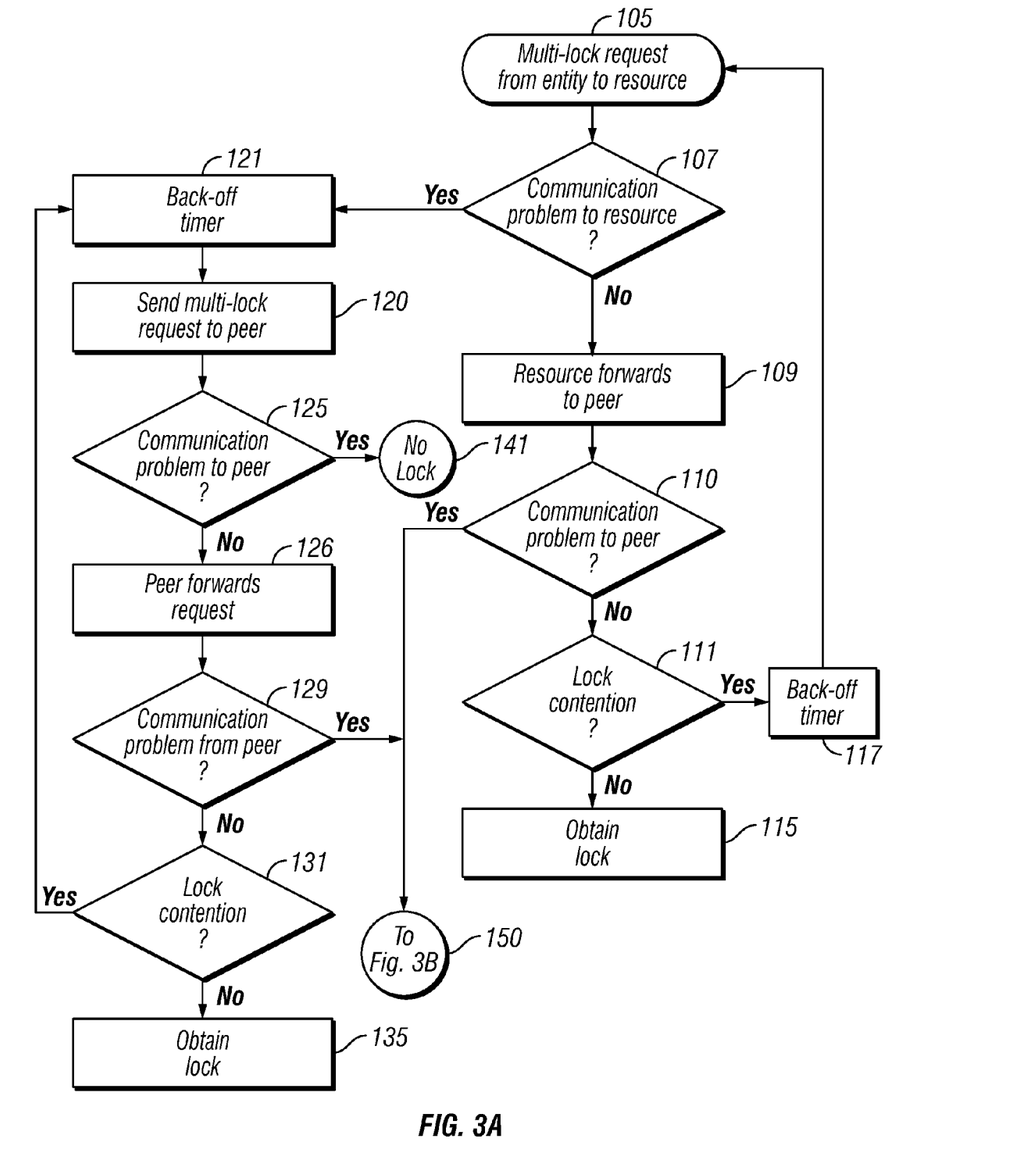
FIGS. 3A and 3B are flow charts depicting an exemplary method of operating the system of FIGS. 1 and 2.
Figure 3B:
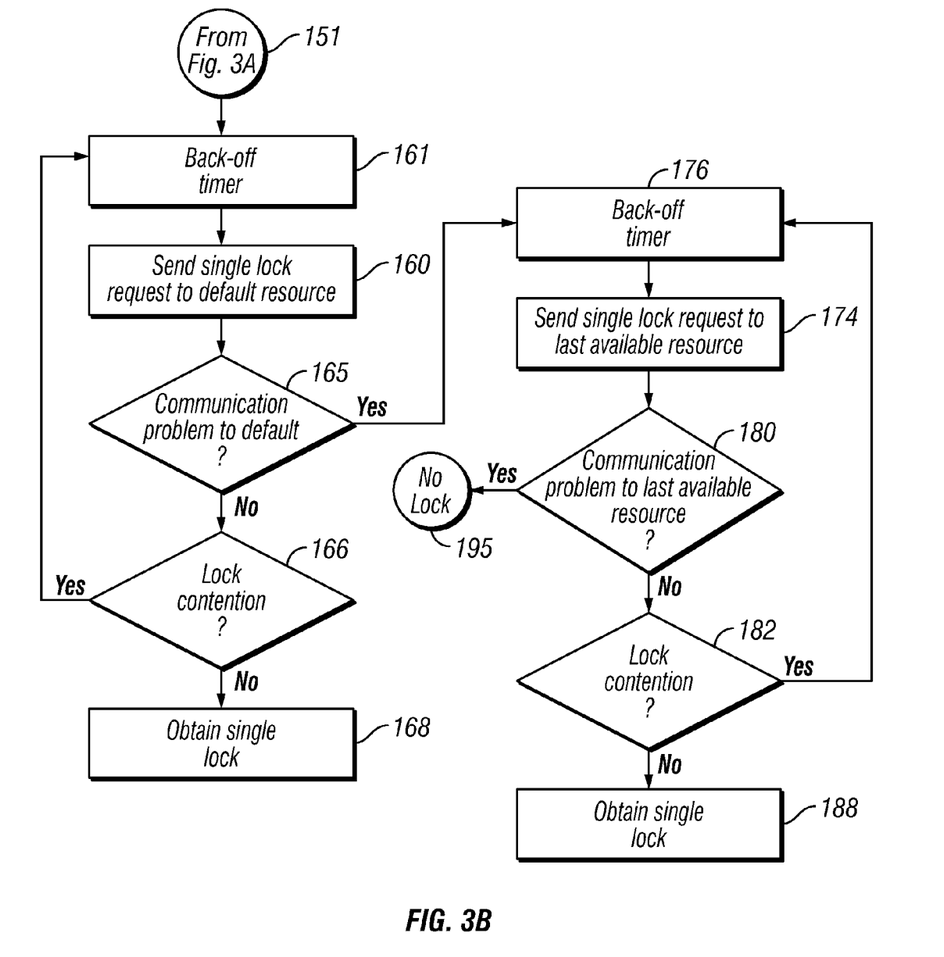
Figure 4:
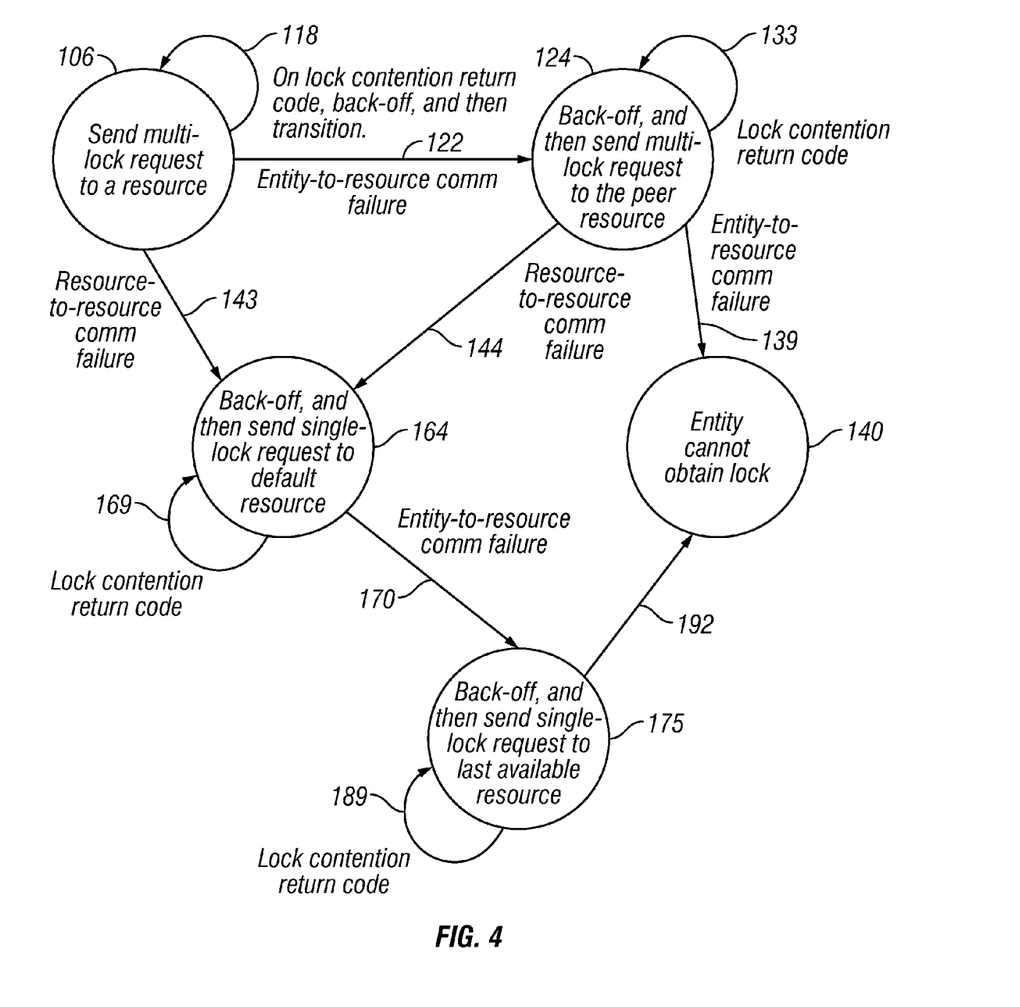
FIG. 4 is a diagrammatic illustration of various states of the system of FIGS. 1 and 2.

Referring to FIGS. 1, 3A, 3B and 4, the field images 71, 72 may each select a logical partition (LPAR) 71A or 71B, and 72A or 72B, respectively, to communicate with an RPC 27A or 27B to obtain the Master lock from both the RPC's. In FIGS. 3A, 3B and 4, a requesting LPAR is referred to as an "entity", and an RPC is referred to as a "resource". As discussed above, various kinds of problems can arise, such as communication failure(s) between the entities (LPAR's) and resources (RPC's), and between the resources, and such as contention problems when the various entities attempt to obtain the Master lock at the same time.

At step 105, one of the computer entities 71A or 71B, and 72A or 72B, enters state 106 requesting a multi-resource lock to one of the multiple resources 27A or 27B. The request is termed a multi-resource lock to obtain a lock from both of the RPC's for the field image. It is possible that both field images are requesting the lock at the same time.

If in step 105, the requesting computer entity, for example entity LPAR 71A, communicates with the one resource, for example RPC 27A, without a problem ("NO" in step 107), the state 106 remains the same and the one resource determines whether a resource lock is available at the one resource and, if so, in step 109 communicates with all peer resources, for example RPC 27B, to determine whether a resource lock is available at the peer resource(s). If in step 109, the one resource, for example entity RPC 27A, communicates with the peer resource(s), for example RPC 27B, without a problem ("NO" in step 110), the state 106 remains the same and the one resource determines whether a resource lock is available at the peer resource(s), meaning that there is no contention for the lock. If step 111 indicates that there is no contention for the lock at either the one resource (RPC 27A) or the peer resource (RPC 27B), all of the resources are locked to the requesting computer entity in step 115, thereby obtaining the lock from the resources, and the one resource (RPC 27A) communicates the lock of the resources to the requesting computer entity (LPAR 71A), and state 106 has successfully obtained the Master lock.

A likely outcome is that step 111 one of the RPC's provides a lock contention return code ("YES"). At that point, the requesting entity (LPAR 71A) activates a back-off timer in step 117 which provides a random time interval, and, when the timer expires, the requesting entity repeats the request at step 105. This process is shown as loop 118 with respect to state 106.

The requesting computer entity, for example LPAR 71A, is unable to communicate with the one resource to determine whether the multi-resource lock is available ("YES" in step 107), and, if so, the requesting computer entity, in step 120, requests the multi-resource lock to a peer resource, for example RPC 27B, of the multiple resources. Step 120 may optionally occur after activating a back-off timer in step 121 which provides a random time interval, and, when the timer expires, the requesting entity sends the request at step 120. This process is shown as path 122 from respect to state 124.

If in step 120, the requesting computer entity, for example entity LPAR 71A, communicates with the peer resource, for example RPC 27B, without a problem ("NO" in step 125), the state 124 remains the same and the peer resource determines whether a resource lock is available at the peer resource and, if so, in step 126 communicates with the other resources, for example RPC 27A, to determine whether a resource lock is available at the other resource(s). If in step 126, the peer resource, for example entity RPC 27B, communicates with the other resource(s), for example RPC 27A, without a problem ("NO" in step 129), the state 124 remains the same and the peer resource determines whether a resource lock is available at the other resource(s), meaning that there is no contention for the lock. If step 131 indicates that there is no contention for the lock at either the peer resource (RPC 27B) or the other resource (RPC 27A), all of the resources are locked to the requesting computer entity in step 135, thereby obtaining the lock from the resources, and the peer resource (RPC 27B) communicates the lock of the resources to the requesting computer entity (LPAR 71A), and state 124 has successfully obtained the Master lock.

In step 131, one of the RPC's may provide a lock contention return code ("YES"). At that point, the requesting entity (LPAR 71A) activates a back-off timer in step 121 which provides a random time interval, and, when the timer expires, the requesting entity repeats the request at step 120. This process is shown as loop 133 with respect to state 124.

If, however, the original request of step 120 results in a communication problem from the requesting entity (LPAR 71A) with respect to the peer resource (RPC 27B) ("YES" in step 125), that taken together with the communication problem from the requesting entity with respect to the one resource (RPC 27A) ("YES" in step 107), means that there is no communication by the requesting entity to the resources, shown as path 139 from state 124, and that the entity cannot obtain a lock, shown as state 140 and step 141. The Master lock may therefore be obtained by another requesting entity.

Another potential problem is that step 109, shown as path 143 from state 106, or step 129, shown as path 144 from state 124, indicates that communication from the requesting entity to at least one resource is OK, but that there is a failure with respect to the communication between the resources (RPC 27A and RPC 27B). In this case, connector 150 indicates that the process flow is to connector 151.

The requesting computer entity, in step 160, requests a single resource lock to a default resource, for example the resource identified as associated with the requesting entity. In one example, LPAR 71A may identify RPC 27A as its default resource. Step 160 may optionally occur after activating a back-off timer in step 161 which provides a random time interval, and, when the timer expires, the requesting entity sends the request at step 160. This process is shown as state 164.

If in step 160, the requesting computer entity, for example entity LPAR 71A, communicates with the default resource, for example RPC 27A, without a problem ("NO" in step 165), the state 164 remains the same and the default resource determines whether a resource lock is available at the default resource in step 166, meaning that there is no contention for the lock. If step 166 indicates that there is no contention for the lock at the default resource (RPC 27A), the resources under the control of RPC 27A are locked to the requesting computer entity in step 168, and the default resource (RPC 27A) communicates the lock of the resources to the requesting computer entity (LPAR 71A), and state 164 has successfully obtained the single lock.

In step 166, the default RPC may provide a lock contention return code ("YES"). At that point, the requesting entity (LPAR 71A) activates a back-off timer in step 161 which provides a random time interval, and, when the timer expires, the requesting entity repeats the request at step 160. This process is shown as loop 169 with respect to state 164.

If, however, the single lock request of step 160 results in a communication problem from the requesting entity (LPAR 71A) with respect to the default resource (RPC 27A) ("YES" in step 165), that indicates path 170 from state 164, in which the requesting entity (LPAR 71A) sends the single lock request to the last available resource in step 174, also represented as state 175.

In step 174, should dual resources (RPC's 27A and 27B) comprise the available resources, and a communication problem exists between the requesting entity and that resource, the last available resource is the other of the dual resources. For example, if RPC 27A is the default resource for the requesting entity (LPAR 71A), then the other resource (RPC 27B) becomes the last available resource. Step 174 may optionally occur after activating a back-off timer in step 176 which provides a random time interval, and, when the timer expires, the requesting entity sends the request at step 174, in state 175.

If in step 174, the requesting computer entity, for example entity LPAR 71A, communicates with the last available resource, for example RPC 27B, without a problem ("NO" in step 180), the state 175 remains the same and the default resource determines whether a resource lock is available at the last available resource in step 182, meaning that there is no contention for the lock. If step 182 indicates that there is no contention for the lock at the default resource (RPC 27B), the resources under the control of RPC 27B are locked to the requesting computer entity in step 188, and the last available resource (RPC 27B) communicates the single lock of the resources to the requesting computer entity (LPAR 71A), and state 175 has successfully obtained the single lock.

In step 182, the last available RPC may provide a lock contention return code ("YES"). At that point, the requesting entity (LPAR 71A) activates a back-off timer in step 176 which provides a random time interval, and, when the timer expires, the requesting entity repeats the request at step 174. This process is shown as loop 189 with respect to state 175.

If, however, the single lock request of step 180 results in a communication problem from the requesting entity (LPAR 71A) with respect to the last available resource (RPC 27B) ("YES" in step 180), that taken together with the communication problem from the requesting entity with respect to the default resource (RPC 27A) ("YES" in step 165), means that there is no communication by the requesting entity to the resources, shown as path 192 from state 124, and that the entity cannot obtain a single lock, shown as state 140 and step 195.

The inability to obtain either a multi-lock in step 141 or a single lock in step 195 may be reported as an error condition. The error condition is an indication that the communications from the complexes may be interrupted or failing. If the lack of communications is limited to the requesting entity or partition, another of the requesting entities (LPAR 71B) of the field image 71 or a requesting entity of a partition of another field image, such as field image 72, may be able to obtain a multi-lock or a single lock.

Alternatively, there may comprise more than dual resources, and others of the resources may be tested for a single lock by repeating step 160 for other of the resources, and only if a communication problem is detected each instance of step 165, will the process move to steps 176 and 174 to send a single lock request to the last available resource.

ADDITIONAL EMBODIMENT DETAILS

The described techniques may be implemented as a method, apparatus or system, or computer program product, for example in the form of an article of manufacture as stored in hardware such as a computer readable medium. The implementations may involve software, firmware, micro-code, hardware and/or any combination thereof.

Figure 5:
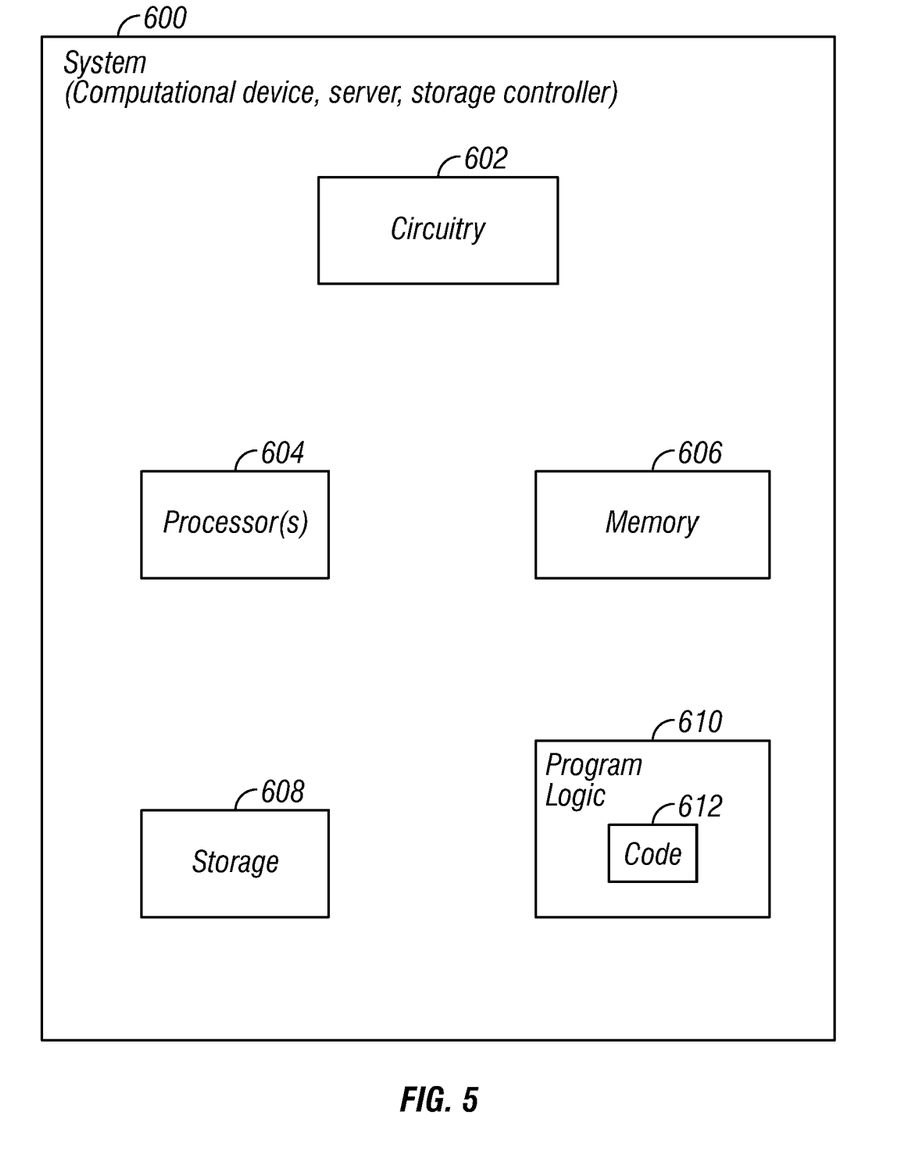
FIG. 5 is a block diagram of exemplary elements that may be employed in the system of FIGS. 1 and 2.

FIG. 5 illustrates a block diagram that shows certain elements shown as system 600 that may be included in the complexes 14A or 14B and RPC's 27, 27A or 27B of FIGS. 1 and 2. The implementation of system 600 included in the complexes 14A or 14B may comprise any or all of CPUs 40A, 40B, power management modules 70A, 70B, and/or storage controllers 72A-75B of FIG. 2, or other systems or components.

The system 600 may comprise circuitry 602 and processor 604. The system 600 may also comprise a memory 606 and storage 608. Memory 606 may for example be volatile, and storage 608 may be non-volatile. The storage 608 may comprise one or more interval storage devices, attached storage devices and/or network accessible devices. The system 600 may comprise program logic 610 including code 612 that may be loaded into memory 606 and/or storage 608 and executed by the processor 604 and/or the circuitry 602. In certain embodiments, the program logic 610 may be stored in storage 608, or alternatively implemented in the circuitry 602. Therefore, while FIG. 6 shows the program logic 610 and code 612 separately from the other elements, the program logic 610 and/or code 612 may be implemented in the memory 606, storage 608, and/or circuitry 602.

The implementations may involve software, firmware, micro-code, hardware and/or any combination thereof. The implementation may take the form of code or logic implemented in a medium, such as memory 606, storage 608 and/or circuitry 602 where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A server system comprising:
a plurality of computer entities, each configured to request locks;
multiple resources; and
communication linkage between each of said computer entities and each of said multiple resources, and between each of said multiple resources, wherein:
at least one of said computer entities is configured to request a multi-resource lock to one of said multiple resources via said communication linkage;
said one resource is configured to determine whether a resource lock is available at said one resource and, if so, communicating with all peer said resources to determine whether a resource lock is available at all said peer resources via said communication linkage;
if all said peer resources indicate a resource lock is available, lock all of said resource locks to said requesting computer entity, and said one resource communicates said lock of said resources to said requesting computer entity via said communication linkage; and
if any said resource indicates contention for said multi-resource lock, said one resource communicates said contention to said requesting computer entity via said communication linkage, and said requesting computer entity backs off said multi-resource lock request and, after a random time interval, repeats said request.

2. The server system of claim 1, additionally,
if said requesting computer entity is unable to communicate with said one resource to determine whether said multi-resource lock is available, said requesting computer entity requesting said multi-resource lock to a said peer resource of said multiple resources.

3. The server system of claim 2, additionally,
said peer resource determining whether a resource lock is available at said peer resource and, if so, communicating with all other said resources, including said one resource, to determine whether a resource lock is available;
if all said other resources indicate a resource lock is available, lock all of said resource locks to said requesting computer entity, and said peer resource communicates said lock of said resources to said requesting computer entity; and
if any of said resources indicate contention for said multi-resource lock, said peer resource communicates said contention to said requesting computer entity, and said requesting computer entity backs off said request and, after a random time interval, repeats said request.

4. The server system of claim 3, additionally,
if said peer resource determines a resource lock is available at said peer resource, and is unable to communicate with all said other resources to determine whether a resource lock is available, said peer resource communicates said failure to said requesting computer entity; and
said requesting computer entity backs off said multi-resource request and, after a random time interval, requests a single-resource lock to a default resource of said multiple resources.

5. The server system of claim 4, additionally,
if said default resource indicates contention for said lock, said default resource communicates said contention to said requesting computer entity, and said requesting computer entity backs off said single-resource lock request and, after a random time interval, repeats said request.

6. The server system of claim 1, additionally,
if said one resource determines a resource lock is available at said one resource, and is unable to communicate with all said peer resources to determine whether a resource lock is available, said one resource communicates said failure to said requesting computer entity; and
said requesting computer entity backs off said multi-resource request and, after a random time interval, requests a single-resource lock to a default resource of said multiple resources.

7. The server system of claim 6, additionally,
if said requesting computer entity is unable to communicate with said default resource to determine whether said single-resource lock is available, said requesting computer entity requesting said single-resource lock to any available resource of said multiple resources.

8. The server system of claim 1, wherein said multiple resources each comprises at least one data storage device.

9. A resource configuration system for use with a plurality of computer entities, each configured to request locks for resources, said system comprising:
multiple resources; and
communication interfaces configured to provide communication linkage of each of said multiple resources with respect to each of said computer entities, and to provide communication linkage of between each of said multiple resources, wherein:
one of said resources is configured to respond to a request by one of said computer entities for a multi-resource lock to one of said multiple resources, said response comprising determining whether a resource lock is available at said one resource and, if so, communicating with all peer said resources to determine whether a resource lock is available at all said peer resources via said communication linkage;
if all said peer resources indicate a resource lock is available, lock all of said resource locks to said requesting computer entity, and said one resource communicates said lock of said resources to said requesting computer entity via said communication interface;
if any said resource indicates contention for said multi-resource lock, said one resource communicates said contention to said requesting computer entity via said communication interface, such that said requesting computer entity backs off said multi-resource lock request and, after a random time interval, repeats said request; and
if said one resource determines a resource lock is available at said peer resource, and is unable to communicate with all said other resources to determine whether a resource lock is available, said one resource communicates said failure to said requesting computer entity via said communication interface, such that said requesting computer entity backs off said multi-resource request and, after a random time interval, requests a single-resource lock to a default resource of said multiple resources.

10. The resource configuration system of claim 9, additionally,
if said default resource indicates contention for said lock, said default resource communicates said contention to said requesting computer entity, and said requesting computer entity backs off said single-resource lock request and, after a random time interval, repeats said request.

11. The resource configuration system of claim 9, wherein said multiple resources each comprises at least one data storage device.

12. A computer program product comprising a non-transient computer usable medium storing a computer readable program when executed on at least one computer of a server system, said server system comprising a plurality of computer entities and multiple resources; causes the server system:
one of said computer entities to request a multi-resource lock to one of said multiple resources;
said one resource to determine whether a resource lock is available at said one resource and, if so, to communicate with all peer said resources to determine whether a resource lock is available at all said peer resources;
if all said peer resources indicate a resource lock is available, to lock all of said resource locks to said requesting computer entity, and said one resource to communicate said lock of said resources to said requesting computer entity; and
if any said resource indicates contention for said multi-resource lock, said one resource to communicate said contention to said requesting computer entity, and said requesting computer entity to back off said multi-resource lock request and, after a random time interval, to repeat said request.

13. The computer program product of claim 12, additionally,
if said requesting computer entity is unable to communicate with said one resource to determine whether said multi-resource lock is available, said requesting computer entity to request said multi-resource lock to a said peer resource of said multiple resources.

14. The computer program product of claim 13, additionally,
said peer resource determining whether a resource lock is available at said peer resource and, if so, to communicate with all other said resources, including said one resource, to determine whether a resource lock is available;
if all said other resources indicate a resource lock is available, to lock all of said resource locks to said requesting computer entity, and said peer resource to communicate said lock of said resources to said requesting computer entity; and
if any of said resources indicate contention for said multi-resource lock, said peer resource to communicate said contention to said requesting computer entity, and said requesting computer entity to back off said request and, after a random time interval, repeats said request.

15. The computer program product of claim 14, additionally,
if said peer resource determines a resource lock is available at said peer resource, and is unable to communicate with all said other resources to determine whether a resource lock is available, said peer resource to communicate said failure to said requesting computer entity; and
said requesting computer entity to back off said multi-resource request and, after a random time interval, to request a single-resource lock to a default resource of said multiple resources.

16. The computer program product of claim 15, additionally,
if said default resource indicates contention for said lock, said default resource to communicate said contention to said requesting computer entity, and said requesting computer entity to back off said single-resource lock request and, after a random time interval, to repeat said request.

17. The computer program product of claim 12, additionally,
if said one resource determines a resource lock is available at said one resource, and is unable to communicate with all said peer resources to determine whether a resource lock is available, said one resource to communicate said failure to said requesting computer entity; and
said requesting computer entity to back off said multi-resource request and, after a random time interval, to request a single-resource lock to a default resource of said multiple resources.

* * * * *